Dec. 16, 1930.  B. H. URSCHEL  1,784,856
AXLE FOR SELF PROPELLED VEHICLES
Filed March 7, 1928

Inventor
Bertis H. Urschel
By
Attorney

Patented Dec. 16, 1930

1,784,856

UNITED STATES PATENT OFFICE

BERTIS H. URSCHEL, OF BOWLING GREEN, OHIO, ASSIGNOR TO URSCHEL ENGINEERING COMPANY, OF BOWLING GREEN, OHIO, A CORPORATION OF OHIO

AXLE FOR SELF-PROPELLED VEHICLES

Application filed March 7, 1928. Serial No. 259,796.

My invention has for its object to provide a light weight and an exceedingly strong, durable axle for self propelled vehicles. The invention particularly has for its object to provide an axle formed of steel tubing and having parts thereof so constructed and shaped that the axle will withstand the stresses and strains to which axles are ordinarily subjected and will, by reason of its tubular form, be lighter in weight than the ordinary solid axle commonly used in connection with such vehicles and, moreover, is so constructed and shaped that it may be made at a low cost of production.

The invention particularly provides a construction and process of forming the axle so that it may be securely connected to the frame of the vehicle and also to the stub axles of the guiding wheels of the vehicle and so as to withstand the torque and the shearing stresses and strains to which the axle will be subject in its ordinary use and provide a liberal safety factor for such stresses and strains.

The invention may be contained in axle structure that vary in their details and, to illustrate a practical application of the invention, I have selected an axle containing the invention as an example of the various constructions that embody the invention and shall describe it hereinafter. The axle selected is shown in the accompanying drawing.

Figure 1:
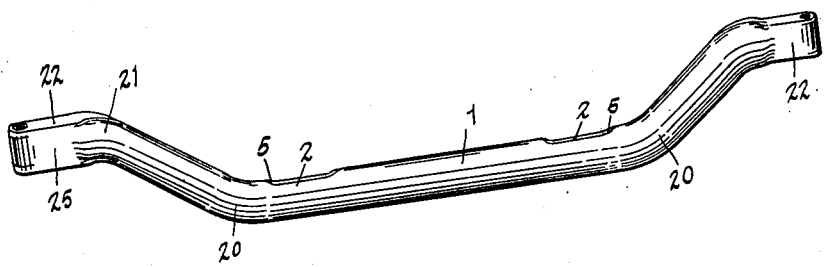
Figure 2:
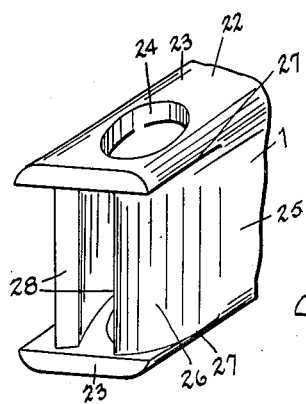
Figure 3:
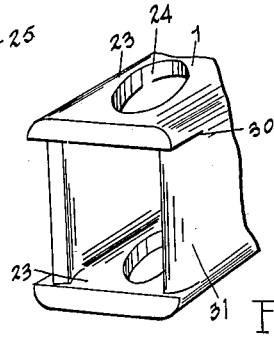
Figure 4:
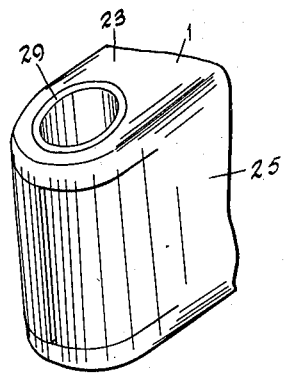

Fig. 1 of the drawing illustrates a side view of the axle. Fig. 2 illustrates the appearance of an end of the axle at a point in the process of its formation. Fig. 3 also illustrates an end of the axle at a point in a process of formation which, however, may be slightly different from the process used in the formation of the axle shown in Fig. 2. Fig. 4 illustrates an end part of the axle when it has been completely formed.

Where it is desired to hang the vehicle at a level below the centers of the supporting wheels of the vehicle, the tube 1 may be bent at its ends angularly upward as at 20 and since the swivelled stub axles protrude horizontally, the ends of the axle are bent at the points 21 in order to form end portions that extend substantially parallel to the body of the axle 1. The end portions 22 are formed substantially rectangular in order to produce at each end a pair of parallel walls extending at right angles to the other pair of parallel walls, the walls, as measured along the axle, being relatively short and the vertical walls having a height that is preferably considerably greater than the width of the top and bottom walls in order to form a large lateral bearing area for withstanding all the torque and stresses to which the ends of the axle will be subjected by reason of its connection to the stub axle brackets or stub axle pins.

The cross sectional area of the ends of the axle is considerably less than the cross sectional area of the tube from which it is formed and, consequently, the walls of the ends are formed thicker than the walls of the body of the axle. The top and bottom walls 23 are bored to form the holes 24 having diameters that are substantially the same as the distance between the parallel side walls 25 so that the surface formed in making the holes will lie tangential to the planes of the inside surfaces of the side walls. The side walls are then slit or cut along the lines located in the planes of the inside surfaces of the top and bottom walls to points in lines that are extensions of the diameters of the openings formed in the top and bottom walls 23 and which lie at right angles to the side walls 25. The ends 26 of the side walls between the cuts 27 are bent cylindrically so that their end edges 28 approach each other and are located between the top and bottom walls, and the inside surfaces of the ends 26 conform to the curvature of the holes 24 formed in the top and bottom walls 23. Preferably, the ends 26 are bent until their end edges are located in close proximity to each other. In bending the ends 26 of the side walls, a suitable mandrel is located in the opening 24 and the ends of the side walls are bent over the mandrel. If desired, the bearing member which may be in the form of a pin or of the tube 29 and fits the holes 24, may be forced therein and the ends 26 may be bent semi-cylindrically on the surfaces of the bearing tube 29.

When the side walls are shaped, the top and bottom walls 23 may be cut away where they protrude beyond the semi-cylindrical surface that is formed by bending the ends 26 of the side walls, leaving a semi-circular portion, on the outside of the top and bottom walls 23, that has a thickness that is substantially the same as the thickness of the metal.

If desired, in the process of formation of the ends of the axle, the ends may be slit as at 30, as the ends 31 are progressively bent, the slitting being produced slightly in advance of the bending of the ends of the side walls. Thus the formation of the ends of the axle during the shaping of the side walls may be done by means of a suitable die that will cut the upper edges of the ends of the side walls, while, at the same time, the die will shape the side walls into semi-cylindrical form. The top and bottom walls are then shaped to conform to the cylindrical surfaces of the side walls at their ends. Also, in forming and slitting the ends of the axle at the same time, a suitable mandrel may be inserted in the openings 24 to provide an anvil or shaping surface for the bending of the ends of the side walls.

When the parts have been shaped they may be welded together, such as along the end edges of the side walls and to the bearing tube and also between the top and bottom edges of the ends of the side walls where they are located in proximity to the inner surfaces of the top and bottom walls 23. The ends of the axle will thus sustain the large torque and stresses that the knuckles of automobiles and trucks are subjected to.

I claim:

1. An axle for a vehicle comprising a tube, the end portions of the tube formed rectangular in shape, the upper and lower side walls of each end portion having openings for receiving a bearing member, the axle having cuts along the corners of the rectangular formed portions, the portions of the remaining side walls located between the cuts bent to extend across the ends of the axle and so that the upper and lower edges of the said portions will lie substantially within end edge portions of the upper and lower sides.

2. An axle for a vehicle comprising a tube, the end portions of the tube formed rectangular in shape, a bearing member extending through the upper and lower side walls of each end portion, the remaining side walls having extended portions bent about the outer sides of the bearing member, substantially the entire inner surfaces of the said bent portions conforming to the outer surfaces of the bearing member, and the upper and lower edges of the said extended portions located between the end edges of the upper and lower side walls, and the end edges of the top and bottom side walls being shaped to substantially conform to the exterior surfaces of the extended portions of the said last named side walls.

3. An axle for a vehicle comprising a tube, the end portion of the tube formed rectangular in shape, the upper and lower side walls of each end of the tube having openings for receiving a bearing member, the remaining side walls having extended portions bent around so that their end edges substantially abut throughout their length and their end portions substantially close the end of the tube, the top and bottom sides having edge portions extending over the edges of the extended portions of the second named side walls and so as to cover the edges of the said extended portions.

4. An axle for a vehicle comprising a tube, the end portions of the tube formed rectangular in shape, a bearing member extending through the upper and lower side walls of each end portion, the remaining side walls having extended portions bent about the outer sides of the bearing member, substantially the entire inner surfaces of the said bent portions conforming to the outer surfaces of the bearing member, and the upper and lower edges of the said extended portions located between the end edges of the upper and lower side walls.

In witness whereof I have hereunto signed my name to this specification.

BERTIS H. URSCHEL.